Aug. 10, 1943.  A. C. FALK ET AL  2,326,210
AIRCRAFT LANDING GEAR
Filed March 14, 1941  2 Sheets-Sheet 2

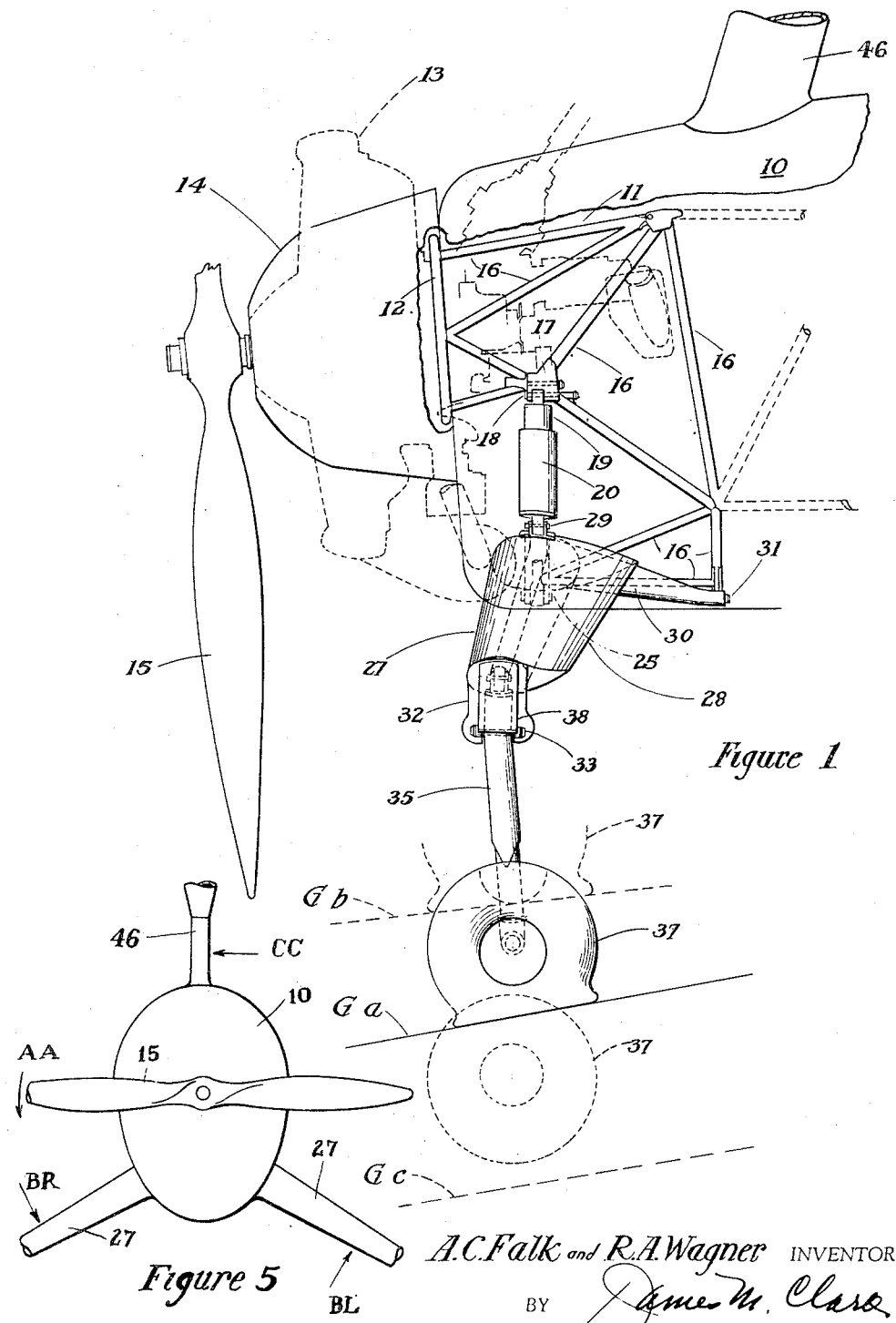

A.C.Falk and R.A.Wagner INVENTORS
BY James M. Clark
their Patent Attorney

Patented Aug. 10, 1943

2,326,210

UNITED STATES PATENT OFFICE 2,326,210

AIRCRAFT LANDING GEAR

Adolf C. Falk, Drexel Hill, and Robert A. Wagner, Sharon Hill, Pa., assignors to Kellett Autogiro Corporation, a corporation of Delaware Application March 14, 1941, Serial No. 383,260

16 Claims. (Cl. 244—104)

This invention relates to running gear for vehicles and more particularly to improvements in aircraft landing gears.

In aircraft which land at relatively steep angles with respect to the ground, and have little or no forward motion upon landing, such as autogiros and certain types of military and other aircraft which land at relatively low speeds within confined spaces, it is required that the landing gear have a relatively wide tread and high vertical travel. In such aircraft, particularly autogiros, it is also desirable that the landing gear tread be very wide, have a relatively high vertical travel, and extremely important that the tread be substantially constant in all positions whether loaded or unloaded. Inasmuch as autogiros are usually devoid of wing surfaces, or have but small stub wings, the problem of providing such a landing gear has not been without its particular problems. These difficulties have been contributed to in prior designs by landing gears of insufficient flexibility and resulting tendencies toward rough rotor operation due to ground resonance. In the past difficulty has also been experienced with the autogiro tending to lean laterally, especially after making a turn, because of the unequal extension of the shock struts. Due also to the lack of fixed wings on rotative wing aircraft, it has been found necessary in the past to correct for engine torque by arranging the right and left sides of the tail surfaces with different angles of attack so as to neutralize the engine torque at the tail of the machine. This, however, requires that the fuselage structure be capable of transmitting this additional torque and it has also been found that in changing throttle positions rapidly there is appreciable lag in the correction of the torque.

The above and other objections have been successfully overcome by the landing gear comprising the present invention. This has been accomplished by a novel strut arrangement comprising two spaced struts each pivotally mounted upon the aircraft and pivotally carrying a ground-engaging element, wherein one of the struts serves as a push-pull or radius rod to maintain predetermined attitudes and positions of the ground-engaging element and the other of said struts is formed with a streamlined hollow body portion and offset terminal pivots such that it serves the dual purpose of a structural load-carrying member and as an enclosing fairing for the radius rod. This arrangement also has the advantage of permitting a relatively wide-tread, high travel landing gear to be supported from relatively closely spaced pivots on the fuselage framework as well as housing of the shock absorbing strut substantially entirely within the normal outline of the fuselage.

It is accordingly a major object of the present invention to provide a flexible landing gear of relatively wide but substantially fixed or constant tread. It is also a primary object to provide such a landing gear which has a relatively high vertical travel of the landing wheel between the extreme positions in which there is relatively little change in the wide tread of the gear. It is a further object to provide a landing gear strut arrangement of simplified form in which a single continuous strut having an intermediately hinged joint is exposed to the relative airstream. It is also an object to provide a flexible landing gear to absorb the shock of vertical landings and to particularly assist in obtaining smoother operation of autogiro rotors entirely free from ground resonance.

It is also an object of the present invention to provide means for correcting the lateral tilting or leaning of the aircraft due to unequal extension of the shock struts. It is also an object to provide the landing gear with fairings, which together with the fairing of the pylon structure are set at angles with respect to the longitudinal axis of the aircraft such that they provide countertorque or reactive forces which oppose and balance the engine torque due to the rotation of the propeller. Among the further objects of the present invention is the improved arrangement of the struts and the shock absorber such that a relatively simple but efficient landing gear is obtained.

Other objects and advantages of the present invention will become apparent to one skilled in the art after a reading of the following specification and the accompanying drawings forming a part hereof, of which:

Fig. 1 is a side elevation of the forward portion of an aircraft to which the improved landing gear is shown attached;

Fig. 5 is a front elevation of the aircraft showing diagrammatically the engine countertorque surfaces.

Figures 2, 3, 4:
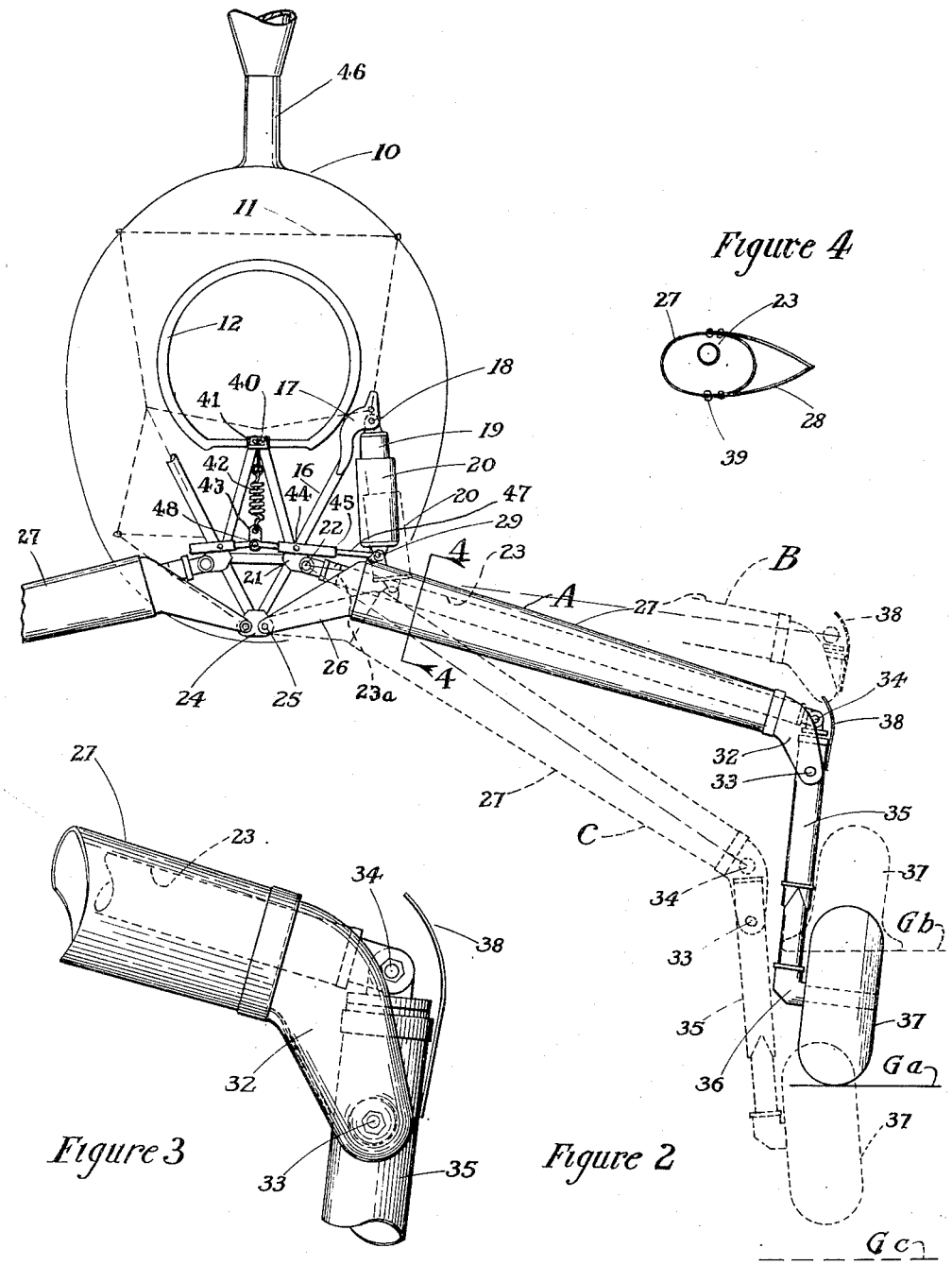
Fig. 2 is a front elevation of the same landing gear.
Fig. 3 is a detailed view of the pivotal joint or elbow between the main landing gear struts.
Fig. 4 is a cross-sectional view taken along the lines 4—4 of Fig. 2.

Referring now to Figs. 1 and 2 the nose portion of an airplane fuselage is indicated at 10 having a structural framework 11 carrying an engine mounting ring 12 from which a conventional engine 13 is supported. The engine may be partly or fully enclosed by a suitable cowl 14 and has provided upon its crankshaft a suitable tractor propeller 15. The aircraft is provided with a pylon 46 which serves as a supporting structure for the rotative wing system. The structural framework of the fuselage 11 is provided with bracing members 16 several of which are arranged to converge in the region of, and to support the upper pivot fitting 17. This fitting provides a pivotal connection 18 for the piston element 19 of an oleo shock absorber, the outer casing or cylinder element of which is indicated at 20. The fitting 17 is preferably given a goose-neck form to accommodate the shock absorber strut portion 19.

Certain of the bracing elements 16 of the fuselage framework also converge to support the intermediate fitting 21 which is located below and inboard of the fitting 17. The fitting 21 provides a pivotal connection 22 for a push-pull rod or radius element 23. To eliminate the torsional load which would normally be developed within the push pull tube 23 due to the deflection of the landing gear, a thrust bearing 23a is incorporated at the inner end of the tube 23 lying entirely within the tube. This bearing 23a is arranged such that it permits rotational motion of the end fitting at 22 relative to the tube 23 while at the same time being capable of transmitting either tensile or compressive forces between its pivotal connections at each terminal. Other of the bracing elements 16 are disposed such that they support the lower pivot fitting 24 located close to the center of the bottom of the fuselage and which is provided with a pivotal connection 25 for the offset terminal 26 of the hollow monocoque strut 27. The fittings 17, 21 and 24, rigidly supported by the fuselage framework, are disposed such that the axes of their respective pivots 18, 22 and 25 are parallel and extend in a longitudinal, or fore and aft, direction with respect to the axis of the aircraft. The several pivot axes are also arranged such that the pivot 25 is disposed below and close to, or on, the vertical center line of the fuselage as compared to the axis of pivot 22.

The hollow monocoque strut 27 is preferably streamlined in cross-section as shown in Fig. 4. It comprises a forward elliptical shell or tubular portion 27 and a relatively thin trailing portion 28 attached to the leading portion by the rivets 39 or other suitable attachment means. The monocoque strut also reduces or tapers in both thickness and chord dimension toward its outer extremity. To the inner extremity of the hollow strut 27 there is rigidly attached the aforementioned downwardly extending terminal fitting 26 pivotally attached to the fuselage at 25. The inner extremity of the hollow strut is also provided at its upper surface with a pivotal connection 29 to the shock absorber 20 and this portion of the strut is also preferably rigidly attached to a faired drag strut 30. The latter is pivotally attached to the fuselage framework at the pivot 31 preferably aligned with the axis of the pivot 25.

The outer extremity of the hollow monocoque strut 27 is provided with a downwardly and outwardly extending offset terminal fitting 32 providing a bifurcated fitting which is suitably apertured for the pivotal connection 33. A substantially vertical wheel-carrying strut 35 is pivotally connected at its upper terminal 34 to the outer terminal of the radius strut 23. The strut 35 is provided with an axle fitting 36 at its lower extremity upon which the landing wheel 37 is rotatably mounted. A fairing plate, or joint shield 38 comprising a resilient bent sheet is attached to the upper terminal of the strut 35 such that in the flight attitude of the landing gear it covers the space between the bifurcated portions of the outer terminal 32 and serves to fair and protect the intermediate pivotal connection 34.

It will be understood that a similar landing gear unit is symmetrically disposed on the opposite side of the aircraft. In Figs. 1 and 2 the landing gear has been shown in full lines in the static position A in which the wheel is at rest upon the ground Ga. The fully deflected position of the landing gear is indicated in the upper dotted lines outlining the position B in which the shock absorber 20 would be fully compressed, the landing gear structure deflected several inches and the tires of the wheels 37 are flattened in their contact with the ground Gb. The lower dotted position of the landing gear as indicated by the position C which depicts the flight or unloaded position of the landing gear as the wheel 38 is suspended from the aircraft and becomes spaced from the ground Gc.

In the lower or flight position C the strut assumes a nearly vertical position, its upper terminal 34 being drawn slightly inwardly toward the fuselage as the wheel-carrying strut 35 is rotated about the pivotal connection 33 due to the fixed length strut 23. As the wheel assumes its static load resulting in position A the entire landing gear assembly is rotated generally in a counter-clockwise direction about the several pivots 18, 22 and 25 such that the fixed length radius strut 23 causes the upper terminal pivot 34 of the wheel-carrying strut 35 to be extended outwardly with respect to the intermediate pivot 33 such that the strut 35 also rotates slightly in a clockwise direction and assumes a nearly vertical position inclined upwardly and outwardly. The tilting of the wheel-carrying strut between these two slightly inclined positions results in the contact points of the wheel 37 with the ground G remaining in a vertical plane or, in other words, providing a landing gear of substantially the same tread between the flight and statically loaded positions. A tail wheel having similar large vertical deflection characteristics maintaining a constant trail distance is also preferably provided when using the present invention on aircraft of the rotative wing type.

As shown in Fig. 2 it will be noted that a tension spring 42 is attached to a lug 41 on the frame bracing 16 being adjustable by means of the wing nut 40. The spring 42 has its other or lower terminal attached to a link 43 which in turn at its lower portion is provided with an elongated slot extending in a vertical direction. A laterally disposed lever 45 is pivotally mounted upon the framework 16 by the pivot pin 44, the inner end 48 of the lever having a terminal engaging the elongated slot of the link 43. The outer end of the lever arm 45 is provided with a telescoping section 47 which in turn is attached to the above mentioned shock strut fitting 29. The telescope section 47 fits into lever 45 permitting the necessary change in length due to the motion of the landing gear arm 27 about its pivot 25 as it moves between fully loaded and unloaded positions. A similar set of telescoping lever arms are pivotally mounted on the opposite side of the aircraft and in turn connect to another similar link 43.

The operation of the centering or equalizing device for the landing gear is as follows: In the event that one side of the landing gear is deflected to a greater amount than the other side, then that side of the landing gear which is the highest, or has been deflected to the greatest extent, will exert a tensile or downward pull upon the spring 42 which in turn tends to pull the landing gear down toward its normal position. At the time of the greatest deflection of the heavily loaded side of the landing gear, the other side will not be subject to the pressure of the spring 42 tending to force it down since the inboard terminal 48 of the lever 45 will be free to move upwardly within the elongated slot of the link 43. The effectiveness of this centering or riding device can be determined by the design and size of the spring 42 and may be adjusted by means of the wing nut 40.

Similarly, as the landing gear is fully deflected due either to maximum landing impact, or other causes, the fixed radius strut 23 causes further outward movement of the pivot 34 and clockwise rotation of the strut 35 about the upwardly swinging pivot 33 such that the additional tilting of the strut 35 is compensated for by the upward and outward rotation of the pivot axis 33 on the monocoque strut 27 and the wheel is moved upwardly with respect to the aircraft in a substantially vertical plane, in which the tread is not changed. In each of these positions of the landing gear it will be noted that the rigid strut 23 is free to move within the interior of the hollow monocoque strut 27 having no direct attachment thereto other than through the fuselage framework between the pivots 22 and 25 and the upper portion of the strut 35 between the pivots 33—34. The two co-directionally extending strut members comprising the hollow strut 27 and the push pull rod 23 form an articulated four-sided or quadrilateral linkage together with the portions of the fuselage framework 16 and the wheel-carrying element 35 which are included between their vertically spaced pivots. It will be noted that a very desirable arrangement is obtained whereby the strut 23 is at all times faired within the hollow strut 27 despite its relative movement with respect thereto, and further that the relatively short shock absorbing strut 19—20 is at all times substantially fully enclosed within the normal outline of the fuselage 10. In all of the positions of the landing gear the area addressed to the airstream is substantially the same having the external appearance of a cantilever type landing gear comprising two fixed length portions with an intermediately articulated elbow or joint causing the two portions to form a generally right-angle support for the landing wheel.

Fig. 5 shows a front elevation of the aircraft in outline disclosing the relative arrangement of the two landing gear members 27 and the pylon 46 for opposing the engine torque developed by the rotation of the propeller. As the propeller 15 rotates in the direction of the arrow A—A a spiral slip-stream is developed in which the airflow moves both rearwardly and rotationally in a counter-clockwise direction as indicated by the arrows BR, BL and CC. The fairings 27 are asymmetrically disposed with respect to the central axis of the fuselage 10 such that as the airblast from the propeller as indicated by the arrows BR and BL, strikes these surfaces a counter-clockwise couple or turning force is produced. Similarly the fairing of the pylon structure 46 is set with respect to the longitudinal plane of symmetry such that it also develops a countertorque correcting force indicated by the arrow CC. The additive sum of the counter-clockwise forces BR, BL and CC is such that it opposes and balances out the clockwise engine torque resulting from counter-clockwise rotation of the propeller as viewed in Figure 5. It will be noted that the landing gear fairings 27 and the pylon structure 46 are disposed at widely separated angles about the axis of the propeller shaft and relatively close behind the propeller. This results in considerable correction of the torque characteristics inasmuch as the countertorque surfaces are more effective in this relationship and also reduce materially the correction lag which obtained heretofore in correcting surfaces disposed at the tail. It also has the advantage that the forces are confined to a short length of the fuselage, or substantially a single transverse plane, close behind the engine attachment points and in a portion of the fuselage which is adequately braced to transmit these forces.

Although the embodiment shown in the drawings has been described as applied to the body of an aircraft of the autogiro type it is not limited thereto but may be used for the support of an airplane or any other vehicle requiring a landing gear. While the landing gear has been shown as of the fixed type it is likewise not limited strictly thereto but the essential features of the present invention may reasonably be incorporated in a landing gear of the retractable type. It will also be noted that although a pneumatic wheel 37 has been indicated as the ground engaging member the present invention also contemplates the substitution of skids or skis therefor and the provision of pontoons or other devices for the support of the aircraft upon the water.

Other advantages and modifications both in general arrangement and detail design which may occur to those skilled in the art after a reading of the present specification are intended to fall within the scope and spirit of this invention as more fully defined in the appended claims.

We claim:

1. An aircraft landing gear comprising a substantially vertical wheel-carrying element, two co-directional strut members extending laterally from spaced pivots on said aircraft to spaced pivots upon said element, one of said members being a hollow streamlined portion enclosing the other of said members, the said members being relatively movable one within the other upon pivotation about said spaced pivots on said aircraft.

2. In an aircraft landing gear, an aircraft structure, a hollow strut pivotally mounted upon said aircraft structure, a wheel-carrying element pivotally mounted intermediate its ends upon said hollow strut, shock absorbing means pivotally connected to the aircraft and to said hollow strut for resiliently opposing pivotal movement of said hollow strut, and second strut means disposed within said hollow strut pivotally interconnecting said aircraft structure and said element at points displaced vertically from those of said hollow strut.

3. An aircraft landing gear comprising a substantially vertical wheel-carrying element, two co-directional strut members extending laterally from vertically spaced pivots on said aircraft to spaced pivots upon said element, a first of said members having a hollow streamlined body portion enclosing the other of said strut members, the longitudinal axis of the said hollow body portion being offset with respect to its said pivotal connections.

4. An aircraft landing gear comprising a substantially vertical wheel-carrying element, two co-axially strut members extending laterally from vertically spaced pivots on said aircraft to spaced pivots upon said element, a first of said members having a hollow streamlined body portion enclosing the other of said strut members, the longitudinal axis of the said hollow body portion being offset with respect to its said pivotal connections, and shock absorbing means interposed between the aircraft and said first member adapted to resiliently oppose pivotal movements of said landing gear assembly with respect to the aircraft.

5. In an aircraft landing gear, a hollow strut pivotally mounted at its inner terminal upon the aircraft, a wheel-carrying element pivotally carried at the opposite terminal of said strut, means connecting said structure and said hollow strut for resiliently opposing its pivotal movement, and second strut means passing at all of its positions through said hollow strut pivotally attached directly to the aircraft and to said element adapted to maintain predetermined attitudes of said element with respect to the air craft in the various positions of the landing gear.

6. In an aircraft landing gear, a substantially vertical element adapted to carry a ground-engaging member, spaced strut co-axially extending members each pivotally connected to the aircraft and to said element forming an articulated four-sided linkage, one of said strut members adapted to serve as an enclosing fairing for the other said member, and shock absorbing means adapted to resiliently oppose movements of said linkage with respect to the aircraft.

7. In aircraft construction, a landing gear comprising a hollow strut pivotally attached to the aircraft, a wheel-carrying element pivotally carried upon said hollow strut, a radius strut pivotally attached directly to the aircraft and to said wheel-carrying element, the said radius strut being disposed in all of its pivotal positions within said hollow strut, and shock absorbing means connecting said hollow strut to said aircraft.

8. In aircraft construction, a landing gear comprising a hollow strut pivotally attached to the aircraft, a wheel-carrying element pivotally carried upon said strut, a second strut member pivotally attached to the aircraft above said first pivotal attachment and to said wheel-carrying element, the said second strut member being co-axially disposed within and independently movable with respect to said hollow strut, and shock absorbing means connecting said hollow strut to said aircraft at a point above the other said pivotal connections.

9. In an aircraft landing gear, a hollow strut having downwardly offset inboard and outboard terminal fittings, said inboard terminal fitting being pivotally attached to the aircraft, a wheel-carrying strut having upper and lower portions pivotally attached at its lower portion to said outboard fitting, a second strut pivotally mounted upon said aircraft pivotally engaging the upper portion of said wheel-carrying strut and being disposed in fairing relationship within said hollow strut, and shock absorbing means interposed between said hollow strut and said aircraft.

10. In aircraft, a landing gear comprising a hollow monocoque strut provided at its inner and outer terminals with downwardly extending portions, the inner of said terminals being pivotally connected to the aircraft, a wheel-carrying strut pivotally mounted intermediate its upper and lower portions upon said outer terminal, shock absorbing means disposed above said hollow strut pivotally connecting the same to the aircraft, and a radius strut having inboard and outboard terminals pivotally mounted upon the aircraft between said hollow strut and shock absorber pivotal connections and pivotally connected at its outboard terminal to the upper portion of said wheel-carrying member, the same radius strut being faired within said hollow strut.

11. In aircraft, a landing gear comprising a hollow monocoque strut pivotally connected at its inboard end to the fuselage, a wheel-carrying strut pivotally attached intermediate its upper and lower portions adjacent the outboard end of said hollow strut, shock absorbing means interposed between said hollow strut and said aircraft and a radius strut pivotally mounted upon the aircraft and extending through said hollow strut in a completely faired relationship to a pivotal connection with the upper portion of said wheel-carrying strut for controlling the attitude of said wheel during its various positions of landing.

12. In an aircraft landing gear, a hollow strut of streamlined cross-section pivotally mounted upon the aircraft, a substantially vertical element pivotally carried intermediate its height adjacent the outboard extremity of said hollow strut, a ground-engaging member, a push-pull rod pivotally mounted upon the aircraft on an axis spaced above and laterally of the said hollow strut pivot and pivotally connected at its outer terminal adjacent the upper extremity of said wheel-carrying element, a shock absorbing strut pivotally connecting the inboard portion of said hollow strut to said aircraft on an axis spaced above and outboard of said other pivot axes, the hollow strut being provided with downwardly offset terminal pivots such that its streamlined body portion encloses and fairs the said rod in all positions of the landing gear.

13. In an aircraft, a landing gear, comprising a laterally extending hollow strut pivotally mounted upon the aircraft for vertical swinging in a transverse plane, a wheel-carrying element pivotally mounted intermediate its ends upon said hollow strut, shock absorbing means for resiliently opposing pivotal movement of said hollow strut, and second strut means laterally disposed within said hollow strut directly pivoted to said aircraft structure and to said element, the said strut means provided with a joint intermediate its ends permitting relative rotation of its end portions when subjected to torsional forces.

14. An aircraft having a landing gear extending from each side thereof, including a hollow strut pivotally mounted upon the aircraft, a wheel-carrying element pivotally mounted intermediate its ends upon said strut, shock absorbing means for resiliently opposing pivotal movement of said strut, a second strut member disposed within said hollow strut pivotally interconnecting said aircraft structure and said element, and resilient means actuated by the pivotal movements of said strut adapted to oppose greater pivotal movement of one of said hollow struts than the other said hollow strut.

15. An aircraft having a landing gear extending from each side thereof, including a hollow strut pivotally mounted upon the aircraft, a wheel-carrying element pivotally mounted intermediate its ends upon said strut, shock absorbing means for resiliently opposing pivotal movement of said strut, a second strut member disposed within said hollow strut pivotally interconnecting said aircraft structure and said element, a lever element pivotally mounted upon the aircraft structure intermediate its terminals, the outer of said lever terminals engaging a pivotal connection of said hollow strut with said shock absorbing means and an equalizing device engaging the inner terminals of said lever elements adapted to resiliently restrain greater pivotal movements of either of said hollow struts with respect to the other.

16. An aircraft having a landing gear extending from each side thereof, each landing gear half including a hollow strut pivotally mounted upon the aircraft substantially at the vertical center line thereof, the pivotal axes of both said hollow struts lying in a common generally horizontally disposed plane, a wheel-carrying element pivotally mounted intermediate its ends upon said hollow strut, a second strut member disposed within the said hollow strut pivotally interconnecting said aircraft structure and said element, and the pivotal connection of said second strut member with the aircraft structure being disposed above and laterally outwardly of the hollow strut connection with the aircraft structure.

ADOLF C. FALK.
ROBERT A. WAGNER.